United States Patent [19]
Polis et al.

[11] 3,852,352
[45] Dec. 3, 1974

[54] METHOD OF PRODUCING ALPHA-METHYL-1-ADAMANTYLMETHYL-AMINE HYDROCHLORIDE

[76] Inventors: Yanis Jurievich Polis, ulitsa Maskavas, 266/4, kv. 38; Ilze Yanovna Grava, ulitsa Tallinas, 41/43, kv. 46, both of Riga, U.S.S.R.

[22] Filed: Dec. 30, 1971
[21] Appl. No.: 214,381

[30] Foreign Application Priority Data
Apr. 13, 1971 U.S.S.R............................ 1641577

[52] U.S. Cl............................................. 260/563 P
[51] Int. Cl............................................. C07c 87/40
[58] Field of Search.............................. 260/563 P

[56] References Cited
OTHER PUBLICATIONS
Ginsburg, "Concerning Amines," pp. 39 and 40, (1968).
Moore, Organic Reactions, Vol. V, pp. 302–310.

Primary Examiner—Lewis Gotts
Assistant Examiner—D. R. Phillips
Attorney, Agent, or Firm—Waters, Roditi, Schwartz & Nissen

[57] ABSTRACT

A method of producing $\alpha$-methyl-1-adamantylmethylamine hydrochloride consists in that 1-adamantylmethylketone is reacted with ammonium formate, formamide, a mixture of formamide and formic acid or a mixture of acetamide and formic acid at the boiling temperature of the reaction mixture with subsequent HCl hydrolysis of the acyl derivative of $\alpha$-methyl-1-adamantylmethylamine thus produced and isolation of the desired product.

The resulting $\alpha$-methyl-1-adamantylmethylamine hydrochloride may be used in medicine as an antivirus preparation, in particular, as an antigrippe preparation.

11 Claims, No Drawings

METHOD OF PRODUCING ALPHA-METHYL-1-ADAMANTYLMETHYL-AMINE HYDROCHLORIDE

The present invention relates to a method of producing α-methyl-adamantylmethylamine hydrochloride to be used in medicine as an antivirus preparation, and in particular, as an antigrippe preparation.

A known method of producing α-adamantylmethylamine hydrochloride comprises reacting 1-adamantylmethylketone with hydroxylamine hydrochloride in a great excess of dry pyridine and absolute ethanol, while boiling the reaction mixture for 2 hours, distilling off the solvents, suspending the residual product in water and filtering off adamantylmethylketone oxime with subsequent reduction thereof with lithium-aluminum hydride in dry tetrahydrofuran under boiling for 3 hours. The mixture thus obtained is then treated with a 10 percent alkaline water solution and with chloroform.

The solution, which is thus obtained, is saturated with hydrogen chloride and evaporated in vacuum. The dry residue is then dissolved in a 10 percent solution of sodium hydroxide and extracted with ether. The ether extract is dried and then saturated with hydrogen chloride with subsequent isolation of the desired product.

The yield of the desired product is of 64 wt. percent as referred to adamantylmethylketone.

The above prior-art method is disadvantageous in that it involves a complicated manufacturing process, including multiple extraction with ether and chloroform (which are inflammable and narcotic products), and the use of dry hydrogen chloride, as well as such products as dry pyridine and dry tetrahydrofuran which require specific pretreatment.

It is an object of the present invention to simplify the process of technology and to reduce the duration of the process.

The above object is accomplished by a method of producing α-methyl-adamantylmethylamine hydrochloride, according to the invention, which consists in reacting 1-adamantylmethylketone with ammonium formate, formamide, a mixture of formamide and formic acid or a mixture of acetamide and formic acid at the boiling temperature of the reaction mixture with subsequent HCl hydrolysis of the resulting acyl derivative of α-methyl-adamantylmethylamine and isolation of the desired product.

In order to increase the yield and to improve the quality of the desired product, it is advantageous to use 1-adamantylmethylketone, acetamide and formic acid in a molar ratio of 1:4:2.

To increase the yield of the desired product, it is advantageous to react 1-adamantylmethylketone with the above-mentioned reactants, while boiling the reaction mixture for 2–3.5 hours.

For increasing the yield of the desired product, it is advantageous to react 1-adamantylmethylketone with ammonium formate in diethylene glycol.

It is advantageous to perform hydrolysis of acyl derivatives of α-methyl-1-adamantylmethylamine under boiling in an excess of hydrochloric acid for 3–5 hours.

The method according to the invention is carried out in the following manner.

1-Adamantylmethylketone is mixed with ammonium formate, formamide, a mixture of formamide and formic acid or with a mixture of acetamide and formic acid. Where 1-adamantylmethylketone, acetamide and formic acid are used as starting reactants, it is advisable to use them in a molar ratio of 1:4:2.

The reaction is performed under boiling, preferably, for 2–3.5 hours. After being cooled, the reaction mixture is diluted with water, and the resulting product is then extracted with an organic solvent. In order to obtain a purer intermediate product — acyl derivative of α-methyl-1-adamantylmethylamine— and to accelerate the hydrolysis thereof, a solution of this product in an organic solvent should be advantageously saturated with hydrogen chloride.

The process may be performed without isolation of the intermediate product as well. Then concentrated hydrochloric acid is added to the isolated intermediate product-acyl derivative of α-methyl-1-adamantylmethylamine — or directly to the reaction mixture (in case the process is performed without isolation of the intermediate product), and the resulting mixture is boiled, preferably for 3–5 hours. The precipitate formed during the hydrolysis is filtered off and recrystallized to obtain the desired product. The yield of the desired product is up to 82 wt. percent as referred to the starting adamantylmethylketone.

The method according to the invention features simple technology.

Complicated synthesis steps inherent in the prior-art method, such as oxime reduction, preparation of hydrochloride from amine, multiple extraction and the like, are dispensed with.

The duration of the process is reduced.

The method according to the invention permits the production of the desired high-quality product suitable for medical use.

Better understanding of the invention may be had from the following examples illustrating practical embodiments of the method of producing α-methyl-1-adamantylmethylamine hydrochloride.

EXAMPLE 1

A mixture of 20 ml. of diethylene glycol, 2 g. of 1-adamantylmethylketone and 3.15 g. of ammonium formate was refluxed for 2.5 hours. The reaction mixture was then cooled, diluted with cold water, whereafter the resulting white precipitate was filtered off, washed with water, suspended in 25 ml. of concentrated hydrochloric acid and then boiled for 30 minutes. The precipitate formed after cooling the reaction mixture was separated and dried to obtain 1.82 g. of the desired product (75 wt percent as referred to the starting ketone), which after having been recrystallized from absolute ethanol had a melting point of higher than 350°C in a short welded-up capillary tube with decomposition and sublimation.

|   | Found: | Calculated for $C_{12}H_{22}NCl$ |
|---|---|---|
| C wt.% | 66.97 | 66.81 |
| H wt.% | 10.35 | 10.27 |
| N wt.% | 6.71 | 6.49 |
| Cl wt.% | 16.35 | 16.43 |

EXAMPLE 2

2 g. of 1-adamantylmethylketone and 3.15 g of ammonium formate were heated in a flask under reflux at the boiling temperature of the mixture for 3 hours. Ketone was partially sublimed and condensed in the reflux condenser. After cooling the reaction mixture, cold water was poured thereinto, and the mixture was extracted with ether. The ether solution ws dried over alkali, filtered and saturated with dry hydrogen chloride. The resulting white precipitate was filtered off, suspended in 25 ml of concentrated hydrochloric acid and boiled for 3 hours. The precipitate thus formed was filtered off to obtain 1.3 g. of a desired product (53.8 wt. percent as referred to the starting ketone) which was identical to that of Example 1.

EXAMPLE 3

2 g. of 1-adamantylmethylketone and 3.15 g. of ammonium formate were boiled in a flask under reflux for 3 hours. After partial cooling of the mixture 25 ml. of concentrated hydrochloric acid was added thereinto, and the mixture was then boiled for 2 hours. Then the mixture was cooled, the resulting precipitate was filtered off, dissolved in water, made alkaline and heated up to 50°–60°C until ammonia release ceased. After cooling, the mixture was extracted with ether, the resulting ether solution was then dried over alkali, filtered and saturated with hydrogen chloride to obtain 1.2 g. of the desired product (50 wt. percent as referred to the starting ketone) which was identical to that of Example 1.

EXAMPLE 4

2 g. of 1-adamantylmethylketone and 15 g. of formamide were boiled in a flask under reflux at the boiling temperature of the mixture. After partial cooling of the mixture, 25 ml. of concentrated hydrochloric acid was added thereinto, and the mixture was boiled for 3 hours. The resulting precipitate was filtered off, after cooling the mixture, and then was dissolved in water and made alkaline. The solution was then heated at a temperature not exceeding 75°C until ammonia release ceased. Then the mixture was cooled and extracted with ether. The resulting ether solution was saturated with hydrogen chloride to obtain 2 g of the desired product (82 wt. percent as referred to the starting ketone) which was identical to that of Example 1.

EXAMPLE 5

2 g. of 1-adamantylmethylketone was mixed with 10 ml. of formamide and 5 ml. of 86 percent formic acid. The resulting mixture was boiled in a flask under reflux for 3 hours. Then the reaction mixture was cooled, diluted with water and extracted with ether. Ether was distilled off, and the resulting oily mass was boiled with 25 ml. of concentrated hydrochloric acid for 2.5 hours.

The resulting precipitate was filtered off after cooling the reaction mixture to obtain 1.3 g. of the desired product (55 wt. percent as referred to the starting ketone) which was identical to that of Example 1.

EXAMPLE 6

A mixture of 3 g. of 1-adamantylmethylketone, 4 g. of acetamide and 1.35 ml. of 86 percent formic acid was boiled for 3.5 hours. Then the mixture was cooled, diluted with water and extracted with ether. The ether solution was dried over alkali, filtered and saturated with dry hydrogen chloride. The resulting precipitate was filtered off and boiled with 30 ml. of concentrated hydrochloric acid for 5 hours.

The reaction mixture was cooled, and the resulting precipitate was filtered off. After recrystallization from a mixture of absolute ethanol and ether 2.32 g of the desired product was obtained (64 wt. percent as referred to the starting ketone), m.p. 365°–367°C.

We claim:

1. A method of producing $\alpha$-methyl-1-adamantylmethylamine hydrochloride comprising reacting 1-adamantylmethyl ketone with a mixture of acetamide and formic acid at the boiling temperature of the reaction mixture to form an acyl derivative of $\alpha$-methyl-1-adamantylmethylamine, then hydrolyzing said acyl derivative with HCl and isolating the desired product.

2. A method according to claim 1, wherein, 1-adamantylmethylketone, acetamide and formic acid are used in a molar ratio of 1:4:2.

3. A method according to claim 1, wherein, the reaction mixture is boiled for 2–3.5 hours.

4. A method according to claim 1, wherein hydrolysis of the acyl derivative of $\alpha$-methyl-1-adamantylmethylamine is carried out by boiling in an excess of concentrated hydrochloric acid for 3–5 hours.

5. A method of producing $\alpha$-methyl-1-adamantylmethylamine hydrochloride comprising reacting 1-adamantylmethyl ketone with a reactant consisting of ammonium formate at the boiling temperature of the reaction mixture to form an acyl derivative of $\alpha$-methyl-1-adamantylmethylamine, then hydrolyzing said acyl derivative with HCl and isolating the desired product.

6. A method according to claim 5, wherein, 1-adamantylmethylketone is reacted with ammonium formate in the presence of diethylene glycol.

7. A method of producing $\alpha$-methyl-1-adamantylmethylamine hydrochloride comprising reacting 1-adamantylmethyl ketone with a reactant consisting of formamide at the boiling temperature of the reaction mixture to form an acyl derivative of $\alpha$-methyl-1-adamantylmethylamine, then hydrolyzing said acyl derivative with HCl and isolating the desired product.

8. A method according to claim 5 wherein the reaction mixture is boiled for 2–3.5 hours.

9. A method according to claim 7 wherein the reaction mixture is boiled for 2–3.5 hours.

10. A method according to claim 5, wherein hydrolysis of the acyl derivative of $\alpha$-methyl-1-adamantylmethylamine is carried out by boiling in an excess of concentrated hydrochloric acid for 3–5 hours.

11. A method according to claim 7, wherein hydrolysis of the acyl derivative of $\alpha$-methyl-1-adamantylmethylamine is carried out by boiling in an excess of concentrated hydrochloric acid for 3–5 hours.

* * * * *